(12) United States Patent
Hamchuck et al.

(10) Patent No.: US 11,276,279 B1
(45) Date of Patent: *Mar. 15, 2022

(54) AUGMENTED REALITY FOR COMPROMISED ATMS

(71) Applicant: Wells Fargo Bank, N.A., San Francisco, CA (US)

(72) Inventors: Robert Hamchuck, San Jose, CA (US); Chris Kalaboukis, San Jose, CA (US); Andrew L. Martinez, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/019,869

(22) Filed: Sep. 14, 2020

Related U.S. Application Data

(63) Continuation of application No. 15/980,530, filed on May 15, 2018, now Pat. No. 10,777,047.

(51) Int. Cl.
| | | |
|---|---|---|
| *G07F 19/00* | (2006.01) | |
| *G06K 9/00* | (2006.01) | |
| *G06T 7/00* | (2017.01) | |
| *G06T 19/00* | (2011.01) | |

(52) U.S. Cl.
CPC ....... *G07F 19/209* (2013.01); *G06K 9/00671* (2013.01); *G06T 7/001* (2013.01); *G06T 19/006* (2013.01); *G07F 19/207* (2013.01)

(58) Field of Classification Search
None
See application file for complete search history.

(56) References Cited

U.S. PATENT DOCUMENTS

| | | | |
|---|---|---|---|
| 8,725,632 B2 | 5/2014 | Tompkins et al. | |
| 9,842,338 B1 | 12/2017 | Shukla et al. | |
| 10,777,047 B1* | 9/2020 | Hamchuck | G06K 9/00671 |
| 2014/0372305 A1* | 12/2014 | Ray | G07F 19/2055 |
| | | | 705/44 |

OTHER PUBLICATIONS

Ladika, Susan; Gas pump and ATM skimmers; Hot to spot them; https://www.creditcards.com/credit-card-news/gas-pump-atm-skimmers.php; Dec. 22, 2017. 10 pages.

* cited by examiner

*Primary Examiner* — Kristy A Haupt
(74) *Attorney, Agent, or Firm* — Foley & Lardner LLP

(57) ABSTRACT

Examples described herein relate to apparatuses and methods of providing automated teller machine (ATM) status notifications using augmented reality. A method includes capturing, by a user device, an image of the ATM, determining a probability that the ATM has been compromised, augmenting the image of the ATM in a manner which reflects the probability that the image has been compromised, and displaying the augmented image on a user interface of the user device.

20 Claims, 9 Drawing Sheets

AUGMENTED REALITY FOR COMPROMISED ATMS

CROSS-REFERENCE TO RELATED APPLICATIONS

The present application is a Continuation of U.S. patent application Ser. No. 15/980,530 titled "AUGMENTED REALITY FOR COMPROMISED ATMS," filed May 15, 2018, which is incorporated herein by references in its entirety and for all purposes.

TECHNICAL FIELD

Embodiments of the present disclosure relate generally to the field of detecting fraudulent activity.

BACKGROUND

Automated teller machines (ATMs) or other payment terminal devices may be compromised by fraudsters placing skimming devices, cameras, or other data capture devices on the ATM. Users of an ATM that has been compromised by one or more of these devices may have their credit or debit card data and other personal information stolen by fraudsters who installed the devices. Augmented reality (AR) is the integration of digital information with a user's environment in real-time. Unlike virtual reality, which creates a totally artificial environment, augmented reality uses the existing environment and overlays new information on top of it. Generally, computing applications, such as smart phone applications, can be tailored to present different interfaces and information to users for different purposes. The different interfaces and information may relate to services performed at an ATM or other financial services. For example, a banking application may present different interfaces depending on the desired banking service the customer is accessing via the banking application. The banking application may present a first interface for viewing account balances, a second interface for locating the nearest ATMs or branches, a third interface for executing transfers between accounts, a fourth interface for paying bills, and so on.

SUMMARY

A first example embodiment relates to a method. The method includes capturing, by a user device, an image of the ATM, determining a probability that the ATM has been compromised, augmenting the image of the ATM in a manner which reflects the probability that the image has been compromised, and displaying the augmented image on a user interface of the user device.

Another example embodiment relates to a provider computing system. The system includes a network interface and a processing circuit including one or more processors coupled to non-transitory memory, the memory comprising an ATM database. The processing circuit is configured to receive a captured image of an ATM from a user device, retrieve stored reference images from the ATM database, compare the captured image and the stored reference images, and determine a discrepancy between the captured image and the one or more stored reference images, the discrepancy relating to a physical modification of the ATM. The processing circuit is further configured to calculate a compromise score based at least on the discrepancy, generate compromise data including at least the compromise score, and transmit the compromise score to the user device to be displayed on a viewing area of the user device.

Another example embodiment relates to a computer-implemented method. The method includes receiving, by a provider computing system, a captured image of an ATM from a user device proximate the ATM, retrieving one or more stored reference images from the ATM database, comparing the captured image and the one or more stored reference images, and determining a discrepancy between the captured image and the one or more stored reference images, where the discrepancy relates to a physical modification of the ATM. The method further includes calculating a compromise score based at least on the discrepancy, generating compromise data including at least the compromise score, and transmitting the compromise score to the user device to be displayed on a viewing window of the user device.

Another example embodiment relates to a mobile device. The mobile device includes a network interface circuit structured to communicate data to and from a provider computing system associated with a provider, a location position sensor structured to determine location data of the mobile device, an input/output device structured to exchange data with a user, and a processing circuit comprising a processor and memory. The processing circuit is structured to determine, by the location position sensor, location position data of the mobile device, transmit, by the network interface circuit, the location position data to the provider computing system, capture and transmit an ATM image to the provider computing system, and receive, by the network interface circuit, compromise data from the provider computing system. The compromise data includes a compromise score. The processing circuit is further structured to generate and display, by the input/output device, a user interface comprising an augmented reality overlay on a viewing window, the augmented reality overlay including the compromise score.

These and other features, together with the organization and manner of operation thereof, will become apparent from the following detailed description when taken in conjunction with the accompanying drawings.

DETAILED DESCRIPTION

Figure 1:
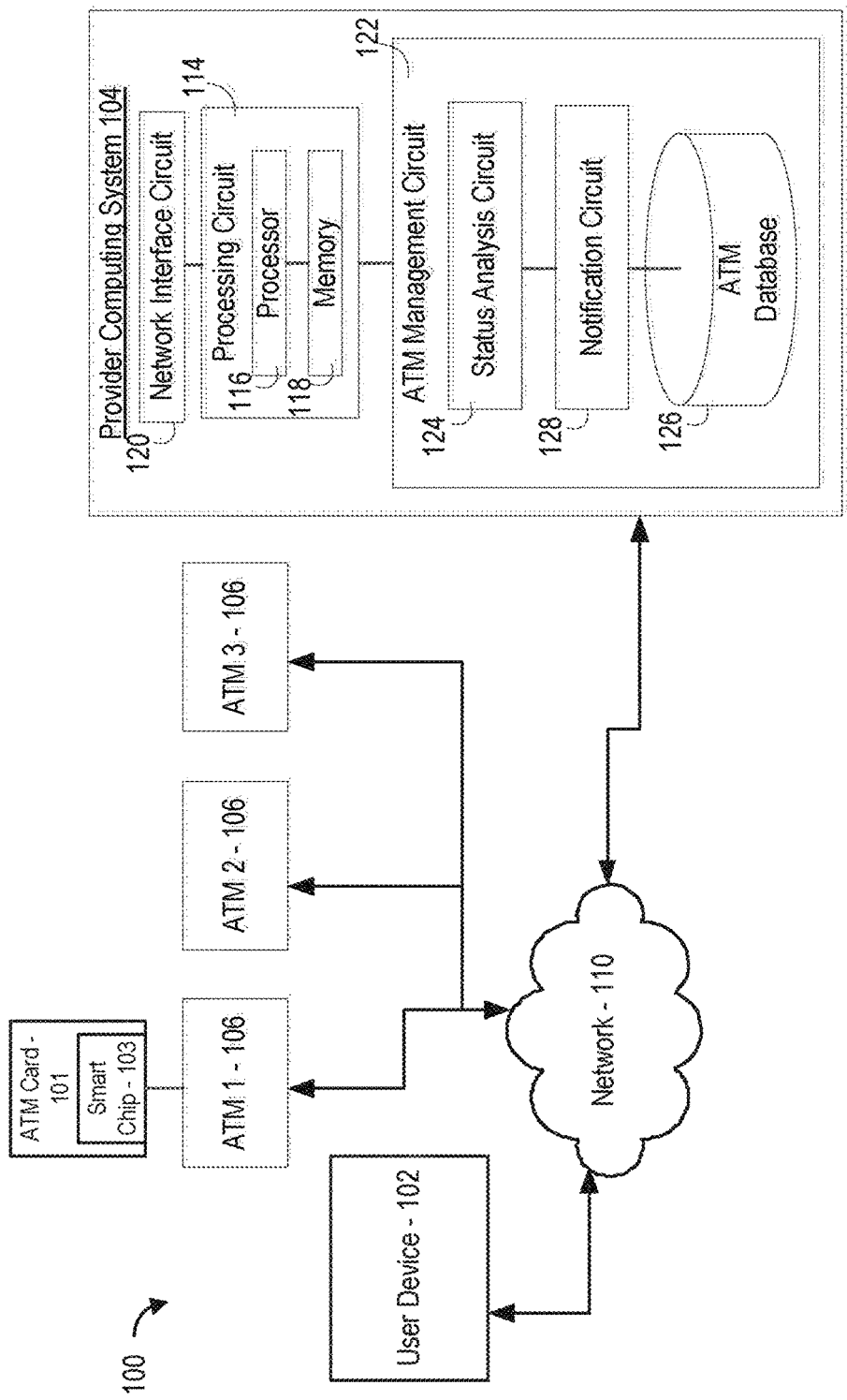
FIG. 1 is a block diagram depicting an example environment for providing ATM status notifications, according to an example embodiment.

Referring to the figures generally, systems and methods of providing real-time notifications of detected compromised devices are described. Based on location data, historical data, captured image data, crowd-sourcing data, and other various data, the system described herein detects whether and to what probability an ATM or other payment terminal device has been compromised. For example, an ATM may be compromised by fraudsters who attach physical devices, such as card skimmers or cameras, to an ATM to capture credit/debit card numbers, personal identification numbers (PINs), and other data. The stolen data can be used to make fraudulent purchases or sold to other fraudsters. However, in order to install data capture devices on an ATM, fraudsters may need to make physical modifications to the ATM and/or use devices which transmit signals (e.g., Bluetooth signals) not indicative of an ATM signal. The system described herein assists in the detection of those modifications. As referred to herein, the term "compromised" refers to an ATM or payment terminal device that has been tampered with or modified, including, but not limited, an ATM having a skimming device installed in the card reader, an installed camera, a keypad device, etc.

Accordingly, the present disclosure is directed to systems and methods for providing a consumer with real-time notifications on the likelihood of an ATM being compromised. Using a client application on a user device, the system provides a user with an AR view overlaid on an image of the ATM, indicating if and to what probability the ATM has been compromised. Before a user uses an ATM, the user can use their user device (e.g., smartphone) to capture the location and an image of the ATM. The location and image data is transmitted to the system described herein which compares the image of the device against prior images of the device previously logged in the system, any data about that specific device (e.g., location data), and previous attempts to compromise that specific device, as well as any other trend and historical data about that device and its location. Using the gathered data, the system then makes a determination of a probability that the device has been compromised and transmits that data back to the user device. Based on the received information, the client application on the user device constructs an augmented reality overlay over the live image of the device, also displaying the calculated probability that the device has been tampered with among other generated information, such as which portion of the ATM has been compromised, etc. In general, a user contemplating whether to use a particular ATM may improve the informed decision-making process by using an application on the user device that uses AR to determine whether the ATM is compromised. The application provides real-time probability and status recommendations, along with other data described further herein, to the user.

The embodiments described herein solve the technical problem of detecting potential compromise or tampering of an ATM's components that may otherwise go unnoticed by a user of the ATM. By leveraging uniquely assembled information sets, including historical data relating to the compromise of ATMs, crowd-sourcing compromise data over a period of time, as well as gathering signal data that may indicate a compromise, the systems and methods described herein facilitate the detection of compromised ATMs. In this regard, the systems and methods herein integrate previously unconnected data to provide a real-time tailored determination of the likelihood that components of a particular ATM have been tampered with to benefit users of the ATM. In addition, the early detection of ATM compromise, along with preemptive warnings as described herein, facilitate the early repair or replacement of the ATMs, which in turn, limits the amount of users affected by such a compromise. Due to the reduction of user accounts that are affected by compromised ATMs, providers of the ATMs are required to use less resources, time, and potential computer processing and memory requirements on monitoring account activity and resolving fraudulent activity stemming from ATM compromises.

Referring to FIG. 1, an ATM status management system 100 is shown, according to an example embodiment. The management system 100 includes, among other systems, a user device 102, a provider computing system 104, and one or more ATMs 106. The provider computing system includes an ATM management circuit 122 that is integrated within or otherwise communicable with, the provider computing system 104. The user device 102, provider computing system 104, and ATM 106 may communicate directly or through a network 110, which may include one or more of the Internet, cellular network, Wi-Fi, Wi-Max, a proprietary banking network, or any other type of wired or wireless network.

The user device 102 is a computing device associated with a user. In some arrangements, the user is an account holder of at least one account managed by the provider (associated with provider computing system 104). An example account may include a checking account, a savings account, a credit account, an investment account, a retirement account, a brokerage account, a mortgage account, a rewards account, and the like. Such accounts may include information indicating account balances, account activities, profile information (e.g., contact information of user), ATM transaction history, etc. An example of ATM transaction history information may include past withdrawal or deposit activities, and past ATM status identification activities (e.g., including transmitting an image of an ATM 106 and receiving a compromise identification and score).

The user device 102 includes any type of computing device that may be used to conduct financial transactions and/or receive information from the provider computing system 104 or the ATM 106. In some arrangements, the user uses the user device 102 to both communicate information to the ATM 106 over the network 110 as well as communicate information with the provider computing system 104. In this regard, the user device 102 may include any wearable or non-wearable device. Wearable devices refer to any type of device that an individual wears including, but not limited to, a watch (e.g., smart watch), glasses (e.g., eye glasses, sunglasses, smart glasses, etc.), bracelet (e.g., a smart bracelet), etc. The user device 102 may also include any type of mobile device including, but not limited to, a phone (e.g., smart phone, etc.), tablet, personal digital assistant, and/or computing devices (e.g., desktop computer, laptop computer, personal digital assistant, etc.).

Figure 2:
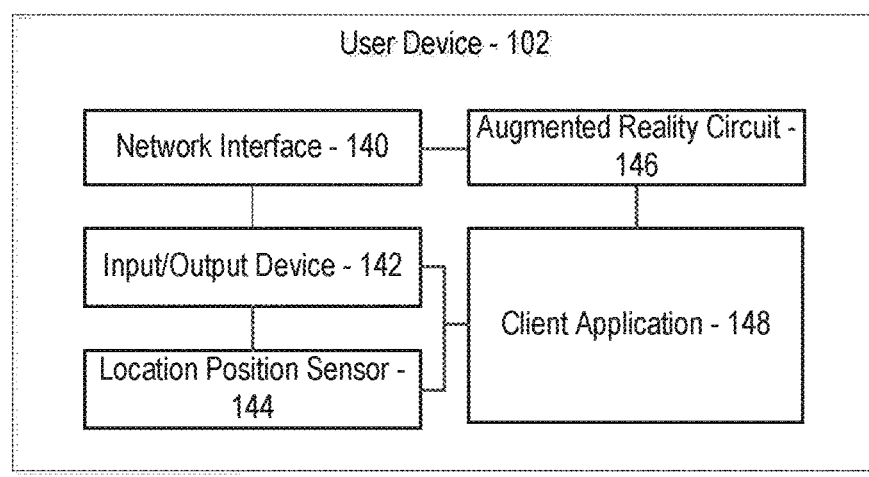
FIG. 2 is a block diagram depicting a user device of the environment in FIG. 1, according to an example embodiment.

In the example embodiment shown in FIG. 2, the user device 102 includes a network interface 140 enabling the user device 102 to exchange information over the network 110, an input/output ("I/O") device 142, a location position sensor 144, and a client application 148. The I/O device 142 is configured to exchange information with the user. An input device or component of the I/O device 142 allows the user to provide information to the user device 102, and may include, for example, a mechanical keyboard, a touchscreen, a microphone, a camera, a fingerprint scanner, any user input device engageable with the user device 102 via a USB, serial cable, Ethernet cable, and so on. Specifically, the input device includes one or more cameras (e.g., digital camera, video camera) for capturing visual data (e.g., still images or digital video) representing the user's view through a viewing area (e.g., viewing area 502 of FIG. 5) of the user device 102. An output device or component of the I/O device 142 allows the user to receive information from the user device 102, and may include, for example, a digital display (e.g., an AR overlay display), a speaker, illuminating icons, LEDs, and so on.

The location position sensor 144 is structured to receive location data and determine a location or receive information indicative of a location of the user device 102. In one embodiment, the location position sensor 144 includes a global positioning system (GPS) or any other type of location positioning system. As such, the location position sensor 144 receives latitude data, longitude data, and any other type of location or position data to determine the location of the user device 102. In other embodiments, the location position sensor 144 receives an explicit location identification from the user of the user device 102. All such variations are intended to fall within the spirit and scope of the present disclosure.

The client application 148 is structured to provide displays to the user device 102 that enable the user to manage provider accounts. Accordingly, the client application 148 is communicably coupled to the provider computing system 104 (e.g., the ATM management system 122, the accounts database 132, etc.). In some embodiments, the client application 148 may be incorporated with an existing application in use by the provider (e.g., a mobile banking application or a mobile wallet application). In other embodiments, the client application 148 is a separate software application implemented on the user device 102. The client application 148 may be downloaded by the user device 102 prior to its usage, hard coded into the memory of the user device 102, or be a web-based interface application such that the user device 102 may provide a web browser to the application, which may be executed remotely from the user device 102. In the latter instance, the user may have to log onto or access the web-based interface before usage of the applications. Further, and in this regard, the client application 148 may be supported by a separate computing system including one or more servers, processors, network interface circuits, etc. that transmit applications for use to the user device 102. In certain embodiments, the client application 148 includes an API and/or a software development kit (SDK) that facilitate the integration of other applications with the client application 148. For example, the client application 148 may include an API that facilitates the receipt of information pertaining to the status of the ATM 106 as described further below.

The displays presented to the user via the client application 148 may be indicative of current account balances, pending transactions, profile information (e.g., contact information), and the like. Further, in some embodiments, the client application 148 is also structured to present displays pertaining to the status of an ATM (e.g., whether and to what probability an ATM has been compromised). For example, the client application 148 is configured to present the user with a display that gives the user the ability to determine whether an ATM has been compromised. In some arrangements, the user is presented with displays allowing the user to capture images of the ATM 106 (e.g., via the I/O device 142).

The user device 102 includes an augmented reality circuit 146 configured to overlay the ATM status data in a region of the viewing area (e.g., viewing area 502 shown in FIG. 5) on top of the image of the ATM 106 the user is viewing. For example, upon receipt of the ATM status data (e.g., compromise data described further herein), the augmented reality circuit 146 assembles the ATM status data based on executable instructions included in the ATM status data received from the provider computing system 104 and displays the ATM status data over the image of the ATM 106 in the viewing area of the user device 102.

The user may visit an ATM 106 with the user device 102. For example, in some arrangements, the user carries the user device 102 to the ATM 106. Depending on the purpose of the user's visit to the ATM 106, the customer may access a specific interface of the application being executed on the user device 112. For example, if the purpose of the visit is to withdraw cash from an ATM, the user may be able to pre-stage the ATM transaction through an ATM user interface of the client application 148.

According to an embodiment of the disclosure, the ATM 106 is capable of both receiving deposits and dispensing funds. For example, the ATM 106 may include a currency dispenser that is used to dispense currency when the user wishes to perform a cash withdrawal. The ATM 106 may also include a deposit slot that is configured to receive paper currency and checks when the user wishes to make a deposit. The ATM may also be configured to perform other operations, such as allowing the user to check account balances, purchase stamps, and so on. In one embodiment, the ATM 106 is owned and operated by the provider associated with the provider computing system 104. In other embodiments, the ATM 106 and the provider are owned and operated by different entities. Account holders may choose to use ATMs owned by different providers as a matter of convenience. For example, an account holder of a first provider may withdraw money using an ATM owned by the second provider because the second provider's ATM is located closer to the account holder's home or workplace.

The ATM 106 includes a transaction card slot configured to receive a transaction card inserted by a user. The ATM 106 may further include a keypad, or similar user input device, containing a number of buttons (e.g., alphanumeric, etc.) configured to receive input (e.g., a PIN) from a user. Additionally or alternatively, the ATM 106 may incorporate similar user input devices such as touch screens, gesture recognition, and so on. The user utilizes the user input devices, such as the keypad, to navigate a guided user interface (GUI) of the ATM 106. The GUI allows the user to perform the various functions of the ATM 106 and also display information (e.g., prompts, images, text, etc.) to the user. For example, the GUI of the ATM 106 may display account information (e.g., account balance, account number, etc.) to the user.

To initiate a transaction with the ATM 106, a user may insert an ATM card 101 into a transaction card slot of the ATM 106. The ATM card 101 may be one of several types of transaction cards, including a debit card, a credit card, a stored value card, and the like. The transaction cards may be associated with various financial instruments, including a demand deposit account and/or a line of credit. In some embodiments, data used to identify the instrument is stored on the ATM card 101 on at least one of a magnetic stripe and/or a smart chip 103 (e.g., an EMV chip). The magnetic stripe stores static data, including the primary account number (PAN) associated with the financial instrument as well as a static card security code. Different payment brands refer to this security code as a card verification value (CVV), card verification code (CVC), card ID (CID), or the like. Because the data is static, the magnetic stripes can be easily cloned or duplicated by thieves using skimming devices or other methods. Thus, transactions cards containing only magnetic stripes are at greater risk for fraud. Although the risk of fraudulent activity may be significantly reduced through the use of transaction cards containing smart chips, there is still a potential for fraud even with the use of smart chips. For example, through the use of attachable physical devices, such as cameras, on the ATM 106, a fraudster can capture the card number, the cardholder's name, the security code, and the PIN of the ATM card 101 to use during an online transaction, without the need to insert the card at an ATM or at a merchant point-of-sale terminal. Thus, the system and methods described herein are configured to detect potential compromises targeting both magnetic stripes and smart chips.

The smart chip 103 is a secure integrated circuit chip with a microprocessor and memory that is embedded on the ATM card 101 and configured to facilitate dynamic and cryptographic authentication of account information. The microprocessor on the integrated circuit chip may store applications related to the authentication process. Unlike the static data of the magnetic stripe, every time a transaction card containing a smart chip is used, the smart chip creates a unique transaction code (i.e., distinct from the CVV, CVC, or CID stored on the magnetic stripe) that is utilized to verify a given transaction.

Still referring to FIG. 1, the transaction card slot of the ATM 106 is connected to a card reader. ATM card readers may operate via one of three user actions: swiping, dipping, and inserting. Swiping involves the user passing only the magnetic stripe of a transaction card through a reader. Dipping involves quickly inserting and then removing the card from the card reader. Inserting involves inserting the transaction card fully into a card slot, where it is "grabbed" by the reader to remain within the terminal for the duration of the transaction. After the ATM card 101 has been authenticated, details of the withdrawal transaction and financial instrument data obtained from the ATM card 101 (e.g., smart chip 103) may be transmitted to the provider computing system 104 via the network 110, where the transaction is processed.

The provider computing system 104 is operated by a provider, which is an entity that facilitates various types of transactions between the user device 102 and various other entities. The provider manages the debit and/or credit card held by the user requesting funds from the ATM 106. For example, the provider may be a bank, credit union, a payment services company, or other similar entities. The provider computing system 104 includes, among other systems, a network interface 120 enabling the provider computing system 104 to exchange data over network 110, a processing circuit 114, and an ATM management circuit 122.

The processing circuit 114 includes a processor 116 and memory 118. The processor 116 may be implemented as one or more application specific integrated circuits (ASICs), field programmable gate arrays (FPGAs), a group of processing components, or other suitable electronic processing components. Memory 118 may be one or more devices (e.g., RAM, ROM, Flash memory, hard disk storage) for storing data and/or computer code for completing and/or facilitating the various processes described herein. Memory 118 may be or include non-transient volatile memory, non-volatile memory, and non-transitory computer storage media. Memory 118 may include database components, object code components, script components, or any other type of information structure for supporting the various activities and information structures described herein. Memory 118 may be communicably coupled to the processor 116 and include computer code or instructions for executing one or more processes described herein.

Still referring to FIG. 1, the provider computing system 104 is further shown to include an ATM management circuit 122. The ATM management circuit 122 is configured to determine whether and the likelihood that an ATM has been compromised by a fraudster. The ATM management circuit 122 includes an ATM database 126, a status analysis circuit 124, and a notification circuit 128. While various circuits, interfaces, and logic with particular functionality are shown, it should be understood that the ATM management system 122 includes any number of circuits, interfaces, and logic for facilitating the functions described herein. For example, the activities of multiple circuits are combined as a single circuit and implemented on the same processing circuit.

The ATM database 126 is structured to retrievably store information pertaining to an inventory of ATMs 106. The ATM database 126 may include non-transient data storage mediums (e.g., local disc or flash-based hard drives, local network servers, and the like) or remote data storage facilities (e.g., cloud servers). The ATM database 126 stores information regarding the make and model, location, and status of ATMs 106 including whether the ATM is operational and whether the ATM has been compromised in the past. The ATMs 106 stored in the ATM database 126 can include both ATMs 106 owned and operated by the provider and ATMs owned and operated by other third party providers. In various arrangements, historical compromise information may include an ATM identifier, the date and time of a reported ATM status, the location of the ATM, the make and model of the ATM, the type of ATM components that were compromised (e.g., card reader, keypad, etc.), the number of times an ATM has been deemed compromised, etc. Additionally, the ATM database 126 may also include a listing of ATMs and locations that have never been reported as compromised.

In some arrangements, the ATM database 126 stores reference images of the ATMs 106. For each possible make and model of ATM 106, the ATM database 126 stores a reference image. The reference image may be provided by the manufacturer of the ATM 106. The reference image can also include a crowd-sourced image generated using previously received images of that make and model of ATM 106 and/or of the particular ATM 106 under consideration. The reference image includes an image of what the ATM is supposed to look like if the ATM 106 has not been compromised or tampered with (e.g., the ATM 106 without any physical modifications). Each reference image includes reference image components for each component of the ATM 106. For example, the reference image includes reference image components of the card reader, keypad, machine overlay, and overall look of the ATM 106 such that the ATM management circuit 122 can determine whether any of the components has been physically modified.

The status analysis circuit 124 is structured to receive a captured image of an ATM 106 from the client application 148 of the user device 102, determine the appropriate reference image to use for a comparison, and complete a comparison of the captured image to the appropriate reference image stored in the ATM database 126. Accordingly, the status analysis circuit 124 is communicably and operatively coupled to the ATM database 126 to determine the make and model of the ATM 106 and retrieve the ATM reference images. The status analysis circuit 124 also receives location information of the user device 102 from the location position sensor 144 of the user device 102. Using the location information of the user device 102, the status analysis circuit 124 determines the approximate location of the ATM 106 near the position of the user device 102 and determines the particular ATM 106, including the ATM identifier and the make and model of the ATM 106.

Using this information, the status analysis circuit 124 retrieves the appropriate reference image(s) from the ATM database 126 and completes a comparison between the captured image and the stored reference image to determine if and how an ATM 106 has been compromised. The captured image includes analog or digital information representing the user's view of the ATM 106 through a viewing area (e.g., viewing area 502 of FIG. 5) of the user device 102. In some arrangements, the captured image is a picture taken by a camera of the user device 102. In other arrangements, the captured image is a live-feed image (e.g., as a user views the ATM through in the viewing area 502) captured by the camera of the user device 102. As noted above, the reference image(s) can include both a manufacturer image of the ATM 106 as well as historical crowdsourced images of either that particular ATM 106 or ATMs 106 of the same make and model. In addition to the overall look of the ATM 106, the reference images include reference image components including, but not limited to, card readers, keypads, and machine overlays.

Accordingly, the status analysis circuit 124 compares the overall look of the ATM 106 to the reference images, and in addition, compares each of the reference image components to the respective captured image components. For example, the captured image received by the status analysis circuit 124 includes a captured image component of a card reader. The status analysis circuit 124 compares the captured image of the card reader to the reference image card reader component to determine any physical differences. In some instances when an ATM 106 has been compromised, a wire or other electronic device may be visible extending from the card reader of the ATM 106. In other instances, a plastic sheet may be placed over the keypad of the ATM 106. In other instances, one or more cameras may be positioned on the ATM 106 to capture card numbers and PINs. Various other physical modifications may be indicative of a compromise. The status analysis circuit 124 is thus configured to compare all components of the ATM to the reference image components to determine whether the overall look of the ATM matches with the reference image and, in particular, if any of the components of the ATM appears modified (e.g., because it includes additional suspicious structures).

In other arrangements, the status analysis circuit 124 is also structured to receive data from the user device 102 indicative of signals detecting compromising devices, such as cameras and electronic readers which may have been attached to the ATM 106 and are transmitting signals that are not indicative of an ATM signal. For example, the user device 102 may detect a Bluetooth signal separate from an ATM signal. In addition, the user device 102 may detect other ambient data capture devices in the area proximate the ATM 106 using smartphone sensors (e.g., Bluetooth, Wi-Fi, etc.). For example, a camera that may be configured to capture a user's PIN may not be near the ATM 106, but can be positioned by a fraudster to capture the PIN some distance away from the ATM 106. The camera may use a Wi-Fi protocol to connect to the Internet and is detectable by the user device 102 using Wi-Fi sensors. In this case, the client application 148 of the user device 102 may also report the detection of this signal. The status analysis circuit 124 receives the detected signal and can determine without a visual comparison check against reference images that a compromise is likely to have occurred. An ongoing log of detected signals at an ATM 106 may be stored in the ATM database 126 and retrieved by the status analysis circuit 124 to determine historical trends in the presence of the non-ATM signal. Using this information, the status analysis circuit may be able to determine that the signal is likely related to a compromise of the ATM 106. For example, if no Bluetooth signals have traditionally been detected at a particular ATM, but suddenly a Bluetooth signal was conducted by recent users of the ATM 106, then that suggests the presence of a new Bluetooth signal which further suggests that the ATM 106 may have been compromised. Further, initially, the probability of compromise may be determined as low, but not non-existent (e.g., the Bluetooth signal may simply be the result of an innocent person using a Bluetooth headset in the vicinity of the ATM, and that person may soon leave). However, as time goes on, the probability of compromise may be determined as higher (e.g., because the number of innocent explanations for a new Bluetooth signal in the vicinity of the ATM is assumed to go down as time goes on).

The status analysis circuit 124 is also structured to retrieve historical ATM data from the ATM database 126. The historical data may include a listing of ATM locations, ATM identifiers, ATM locations, the make and model of the ATM, the date and time of a reported ATM status, the type of ATM components that were compromised (e.g., card reader, keypad, etc.), the number of times an ATM has been deemed compromised, etc. Using the historical data, the status analysis circuit 124 can use analysis of whether the ATM has been reported as compromised a certain number of times, the ATM status trends (e.g., whether the ATM has been reported within the last week, month, etc.), the types of components that have been compromised, etc., to determine the likelihood of whether the ATM 106 is compromised.

After completing the comparison of the reference and captured images, analysis of the detection of non-ATM signals, and retrieving the historical data of the particular ATM 106, the status analysis circuit 124 calculates the probability of a compromise of the ATM (referred to herein as a "compromise score"). The compromise score is calculated using the historical data of the ATM 106 in combination with the ATM comparison information and signal information. The compromise score is calculated as a percentage of likelihood that the ATM is compromised. In other words, if the likelihood (i.e., probability) that the ATM has been compromised is determined to be 1, the percentage of likelihood that the ATM has been compromised may be expressed as 100%. In some other arrangements, the compromise score is calculated as a percentage of likelihood that the ATM is not compromised. In other arrangements, the compromise score may take other forms, such as a rating ranging from one to ten. In other arrangements, the compromise score reflects a relative "pass" or "fail" score. For example, if the status analysis circuit 124 determines that there is a likelihood of 95% that the ATM is not compromised, a "pass" score of 95% is given. If the status analysis circuit 124 determines that there is a 65% likelihood that the ATM is compromised, then a 65% "fail" score is given. The relative pass and fail scores are reflected in the user interface 600 of FIG. 6 described below.

In another arrangement, the status analysis circuit 124 receives indications that a number of debit or credit cards have been determined to have been compromised due to reports from various users of fraudulent transactions (e.g., stored in the ATMs database 126). The status analysis circuit 124 can determine that a common link between the compromised cards is that all of the compromised cards were used at a particular ATM 106. In some arrangements, the status analysis circuit 124 also determines that the compromised cards were used at the particular ATM 106 within a certain period of time (e.g., all of the compromised cards were used at the ATM 106 over the last two weeks, etc.). The status analysis circuit 124 can then determine that the ATM 106 is likely to have been compromised due to this common link. Without comparing any visual data or receiving indications of non-ATM signals (e.g., Bluetooth signals), the status analysis circuit 124 determines the ATM 106 is compromised based on this linkage information.

In some arrangements, the ATM location data may also be used to determine the compromise score. Using the location data, the status analysis circuit 124 can determine that the suspect ATM 106 is located in a high-traffic location, such as a sports stadium or a music venue, where many users access the ATM 106 such that a fraudster may target that ATM 106 in particular. If the ATM 106 is positioned in a relatively high-traffic area, the status analysis circuit 124 may increase the compromise score (e.g., probability that the ATM is compromised).

In some arrangements, a certain make and model of an ATM 106 may be identified as being particularly susceptible to compromise. For example, the ATM database 126 may store information relating to the number of times a particular make and model of an ATM is compromised. If one type of ATM is compromised significantly more than others, that make and model may be identified to be more susceptible to being compromised by fraudsters.

In some arrangements, the status analysis circuit 124 weighs the historical information and the comparison information based on the recency of the data. In one example, the status analysis circuit 124 weighs more recent historical compromise data as higher than older historical compromise data in calculating the compromise score. In another example, crowd-sourced images that were gathered one week ago are weighed as more relevant than images that were gathered one year ago.

As one example, if the status analysis circuit 124 has identified the ATM card reader as potentially physically modified through a comparison to reference images, and the card reader of the ATM 106 has been indicated as compromised within the last week by another user, the status analysis circuit 124 will calculate a relatively high compromise score (e.g., 95%). As another example, if the status analysis circuit 124 has determined that the ATM 106 has been reported compromised multiple times within a certain amount of time, the status analysis circuit 124 will calculate a relatively high compromise score. In yet another example, if the status analysis circuit 124 does not identify any discrepancies between the captured and the reference images, and there is only one relatively old past report of the ATM 106 being compromised, the status analysis circuit 124 may calculate a relatively low compromise score.

In some arrangements, a "pass" or "fail" status is given to the ATM 106 based on a predetermined compromise score threshold. As an example, the predetermined compromise score threshold is 40% such that if the compromise score is calculated as a 40% certainty that the ATM 106 has been compromised, the ATM 106 is given a "fail" score. In this example, any compromise score at or above 40% is deemed as a "fail" status and any number below 40% is deemed as a "pass" status. This particular example is not meant to be limiting.

After calculating the compromise score, the status analysis circuit 124 communicates the compromise data, including the compromise score, which components were deemed compromised, etc., to the notification circuit 128 to notify appropriate entities (e.g., user using user device 102, supplier of the ATM 106). Accordingly, the status analysis circuit 124 is communicably and operatively coupled to the notification circuit 128.

The notification circuit 128 is configured to transmit the compromise score to the user device 102 to be displayed (e.g., overlaid) on the user device 102 (e.g., in client application 148). As such, the notification circuit 128 is communicably and operatively coupled to the user device 102 to transmit the compromise score and other ATM data to be displayed on the user device 102. In some arrangements, the notification circuit 128 is also structured to transmit a notification to an ATM supplier that an ATM 106 may have been compromised in order to send out a maintenance crew to repair or replace the ATM 106. In some arrangements, the notification circuit 128 is configured to shut down the operation of the ATM 106. As such the notification circuit 128 may be communicably and operatively coupled to the ATM 106 to shut down the ATM 106 so that the functionality of the ATM is not accessible until the ATM is repaired or replaced. In this arrangement, the notification circuit 128 is also configured to transmit a message to the user device 102 notifying the user of the next nearest ATM or of a non-compromised ATM nearby.

In some arrangements, alternatively, or in addition to the ATM management circuit 122 of the provider computing system 104 determining a compromise score (e.g., probability) that the ATM 106 has been compromised, the user device 102 is also capable of making this determination. The user device 102 (e.g., client application 148) receives the ATM information (e.g., historical ATM information, ATM identifier, ATM make and model, etc.) from the provider computing system 104 and determines (e.g., calculates) the compromise data, including the compromise score (e.g., probability that the ATM 106 has been compromised).

Figure 3:
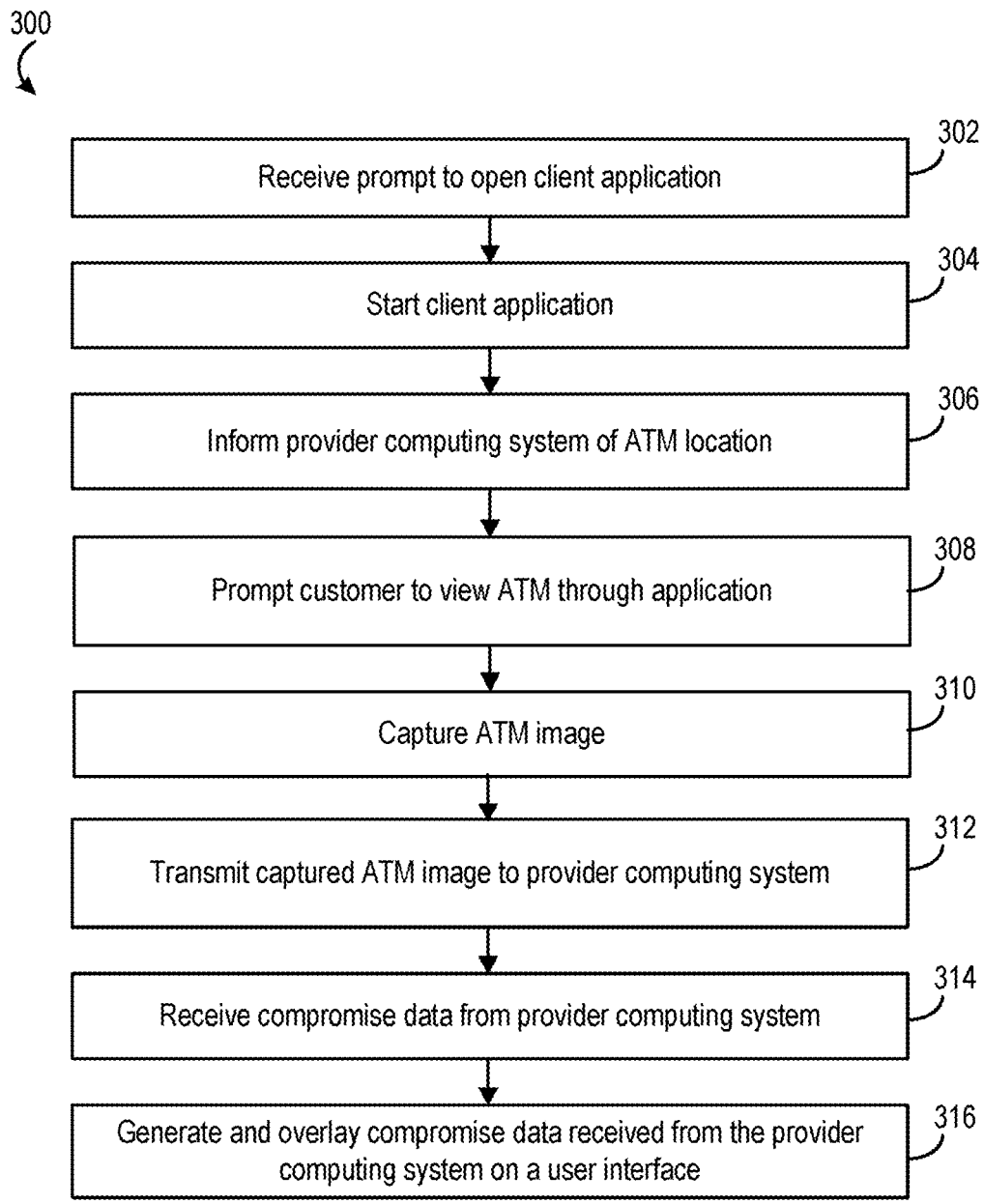
FIG. 3 is a flow diagram depicting a method for providing real-time ATM status notifications using augmented reality, according to an example embodiment.

Referring now to FIG. 3, a flow diagram of a method 300 of providing real-time ATM status notifications using augmented reality is shown, according to an example embodiment. In various embodiments, the method 300 is performed by the components shown in FIGS. 1-2 such that reference may be made to the components of FIGS. 1-2 to aid the description of the method 300.

A prompt to open the client application is received at 302. In some arrangements, the prompt is received by the I/O device 142 of the user device 102. The prompt may include a selection of an icon on the display of the user device 102. The client application is started at 304. The I/O device 142 of the user device 102 is updated to display a client application 148 interface. The provider computing system is informed of the ATM location at 306. In some arrangements, the location position sensor 144 determines the location of the user device 102 and transmits the location to the ATM management system 122 of the provider computing system 104. As described further herein, the location of the user device 102 can be indicative of the ATM location due to the user being proximate the ATM 106 during or before performing a transaction.

The user is prompted to view the ATM through the application at 308. In some arrangements, the user is prompted to view the ATM 106 through the client application 148. The client application 148 receives and displays a message from the provider computing system 104 (e.g., ATM management system 122) to view the ATM through the application. The ATM image is captured at 310. In some arrangements, the ATM is captured using the I/O device 142 of the user device 102. A camera component of the I/O device 142 either takes a picture of the ATM 106 through the client application 142 and/or the ATM 106 is viewed through the camera as a live-feed.

The ATM captured image is transmitted to the provider computing system at 312. In some arrangements, the ATM captured image is transmitted to the provider computing system 104 over network 110 (e.g., via network interface 140 of the user device 102). The compromise data is received from the provider computing system at 314. In some arrangements, as described with regard to method 400 shown in FIG. 4, the compromise data is generated by the ATM management system 122 (e.g., status analysis circuit 124). The compromise data received from the provider computing system is overlaid on the user interface of the user device at 316. In some arrangements, the user device 102 receives the compromise data and the AR circuit 146 overlays the data, including text and images, onto the viewing area of the user device 102 when the user is in the client application 148. As shown in various user interfaces 500-900 described herein with regard to FIGS. 5-9, the compromise data may be displayed in the form of a compromise score and compromise indicators overlaid on the viewing area (e.g., viewing areas 502, 602 shown in FIGS. 5-6) of the user device 102. The overlaid compromise information informs the user of the likelihood that the ATM 106 is compromised and which components of the ATM 106 have been tampered with or physically modified.

Figure 4:
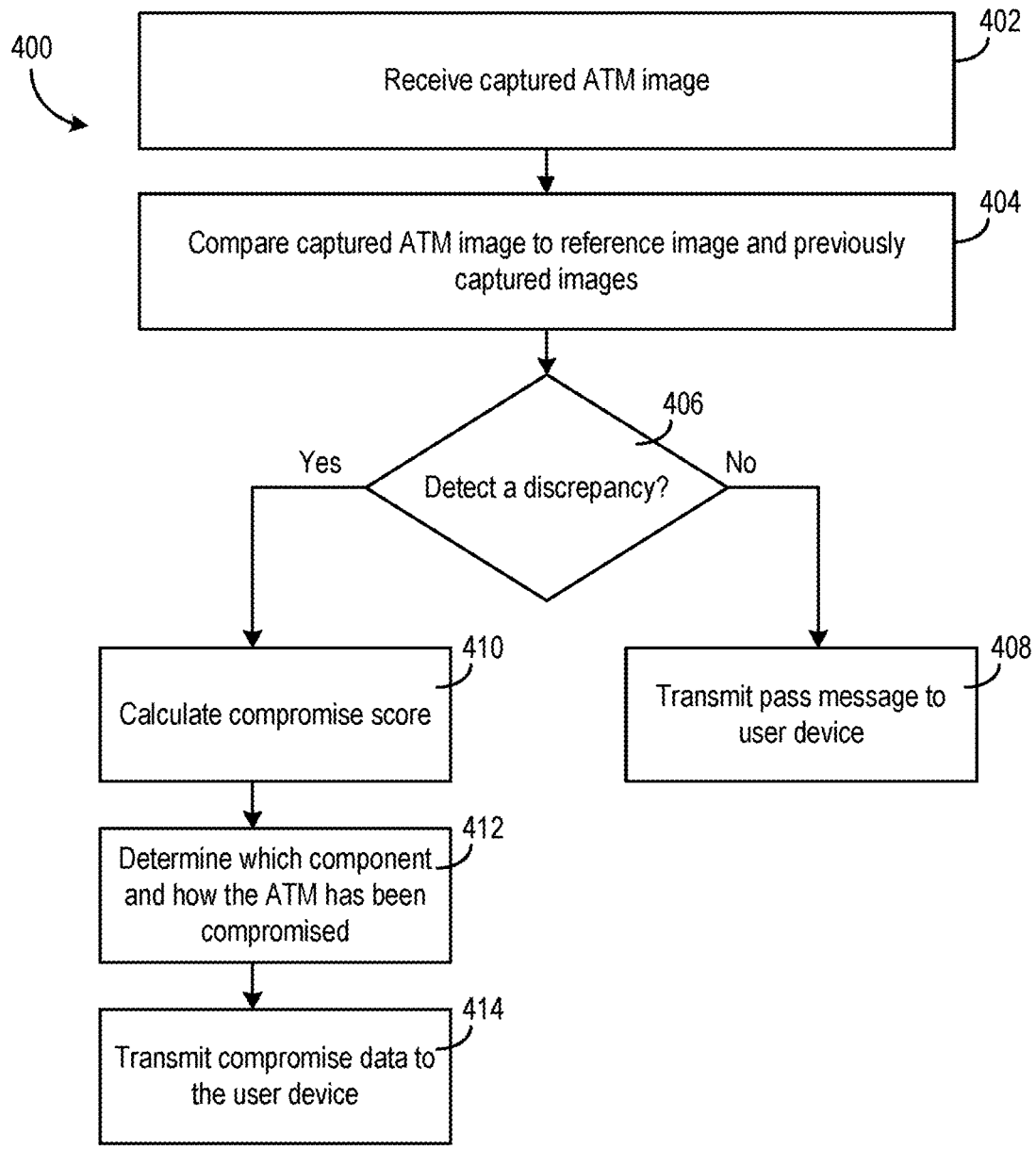
FIG. 4 is a flow diagram depicting a method for providing real-time ATM status notifications using augmented reality, according to an example embodiment.

Referring now to FIG. 4, a flow diagram of a method 400 of providing real-time ATM status notifications using augmented reality is shown, according to an example embodiment. In various embodiments, the method 400 is performed by the components shown in FIGS. 1-2 such that reference may be made to the components of FIGS. 1-2 to aid the description of the method 400.

A captured ATM image is received at 402. In some arrangements, the captured ATM image is received by the ATM management circuit 122, and in particular, the status analysis circuit 124 to be analyzed for potential compromises. In some arrangements, the captured image is a picture taken by a camera of the user device 102. In other arrangements, the captured image is a live-feed image (e.g., as a user views the ATM through in the viewing area 502) captured by the camera of the user device 102.

The captured ATM image is compared to a reference image and previously captured images at 404. In some arrangements, the status analysis circuit 124 is structured to determine the appropriate reference image and previously captured images to use for a comparison, and complete a comparison of the captured image to the appropriate reference images stored in the ATM database 126. As noted above, the reference image(s) can include both a manufacturer image of the ATM 106 as well as historical crowd-sourced images of either that particular ATM 106 or ATMs 106 of the same make and model.

It is determined whether a discrepancy is detected at 406. In some arrangements, by comparing the capture ATM image to the reference images, the status analysis circuit 124 determines whether a discrepancy between the images is detected. If a discrepancy is not detected at 406, a pass message is transmitted to the user device at 408. In some arrangements, the pass message is transmitted by the notification circuit 128 of the ATM management system 122. The notification circuit 128 is configured to transmit the compromise score to the user device 102 to be displayed (e.g., overlaid) on the user device 102.

If a discrepancy is detected at 406, a compromise score is calculated at 410. In some arrangements, the status analysis circuit 124 calculates the probability of a compromise of the ATM as the compromise score. The compromise score is calculated using the historical data of the ATM 106 in combination with the ATM comparison information and signal information. The compromise score is calculated as a percentage of likelihood that the ATM is compromised. In some other arrangements, the compromise score is calculated as a percentage of likelihood that the ATM is not compromised. In other arrangements, the compromise score reflects a relative "pass" or "fail" score such that the compromise score indicates how likely it is that the ATM either passes or fails the analysis performed by the status analysis circuit 124. In some arrangements, the ATM location data and the make and model of the ATM may also be used to determine the compromise score.

It is determined which component and how the ATM has been compromised at 412. In some arrangements, the status analysis circuit 124 is configured to compare all components of the ATM 106 to the reference image components to determine whether the overall look of the ATM matches with the reference image and, in particular, if any of the components of the ATM such as the card reader appears to be physically modified. For example, the captured image received by the status analysis circuit 124 includes a captured image component of a card reader. The status analysis circuit 124 compares the captured image of the card reader to the reference image card reader component to determine any physical differences.

The compromise data is transmitted to the user device at 414. In some arrangements, the compromise data is transmitted to the user device 102 by notification circuit 128. The notification circuit 128 is configured to receive the compromise data from the status analysis circuit 124, package the data to be displayed on the user device 102 in the form of an AR display, and transmit the data to the user device 102 for display.

After calculating the compromise score, the status analysis circuit 124 communicates the compromise score to the notification circuit 128 to notify appropriate entities (e.g., user using user device 102, supplier of the ATM 106). Accordingly, the status analysis circuit 124 is communicably and operatively coupled to the notification circuit 128. In some arrangements, the notification circuit 128 is also structured to transmit a notification to an ATM supplier that an ATM 106 may have been compromised in order to send out a maintenance crew to repair or replace the ATM 106.

Figure 5:
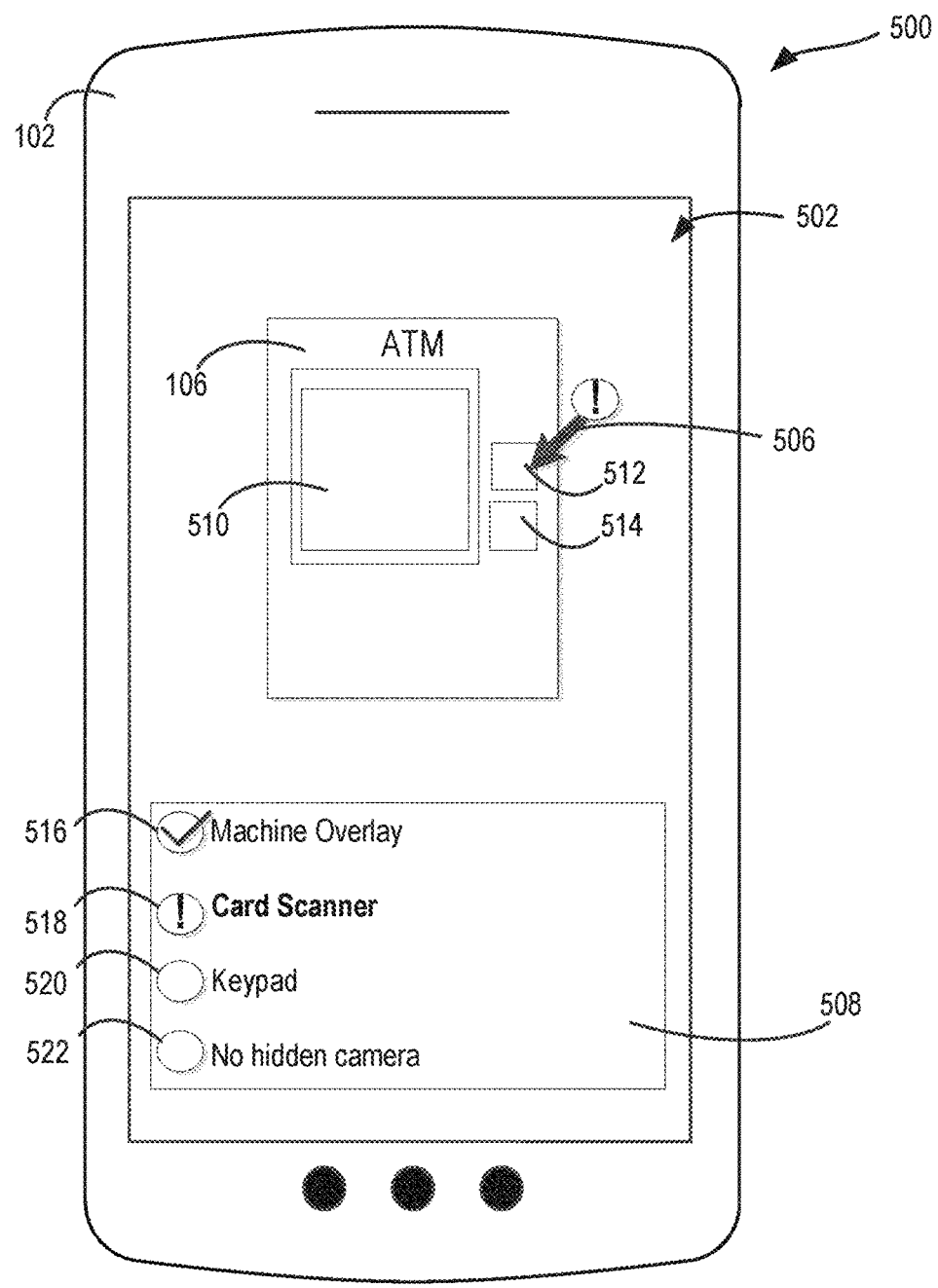
FIG. 5 is a schematic diagram depicting an example user interface of the user device used in the environment in FIG. 1, according to an example embodiment.

Referring to FIG. 5, an example user interface 500 of the user device is shown. The user interface 500 includes a viewing area 502, where the user can view the ATM 106. A user lines up the viewing area 502 with the ATM 106 to capture all components of the ATM 106, including, but not limited to a machine overlay component 510, a card reader component 512, and a keypad component 514. The user interface 500 includes a text box 508 displaying status indicators 516-522. As shown in FIG. 5, in this example, a check mark 516 next to "Machine Overlay" indicates that the machine overlay component 510 has passed the component check done by the ATM management system 122. The user interface 500 shows an exclamation mark indicator 518 next to "Card Reader", which indicates that the ATM management system 122 has determined that the card reader 512 is likely compromised. The overlay on the viewing area 502 displays a compromise indicator 506 at the card reader 512 also indicating the card reader 512 as the compromised component. Dash lines 520 and 522 next to "Keypad" and "No hidden camera" indicate that those components have yet to be checked for compromises.

Figure 6:
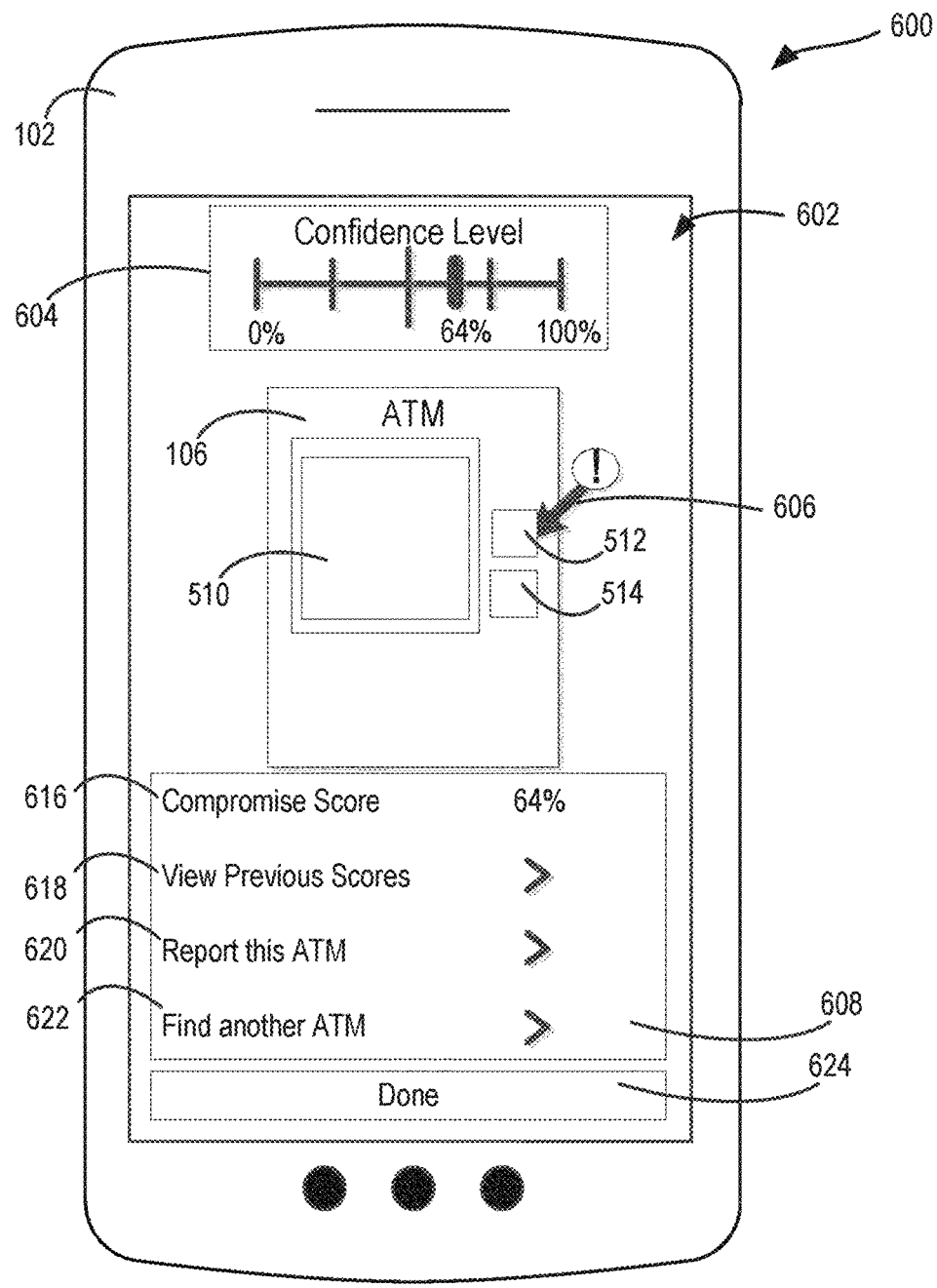
FIG. 6 is a schematic diagram depicting another example user interface of the user device used in the environment in FIG. 1, according to an example embodiment.
Figure 7:
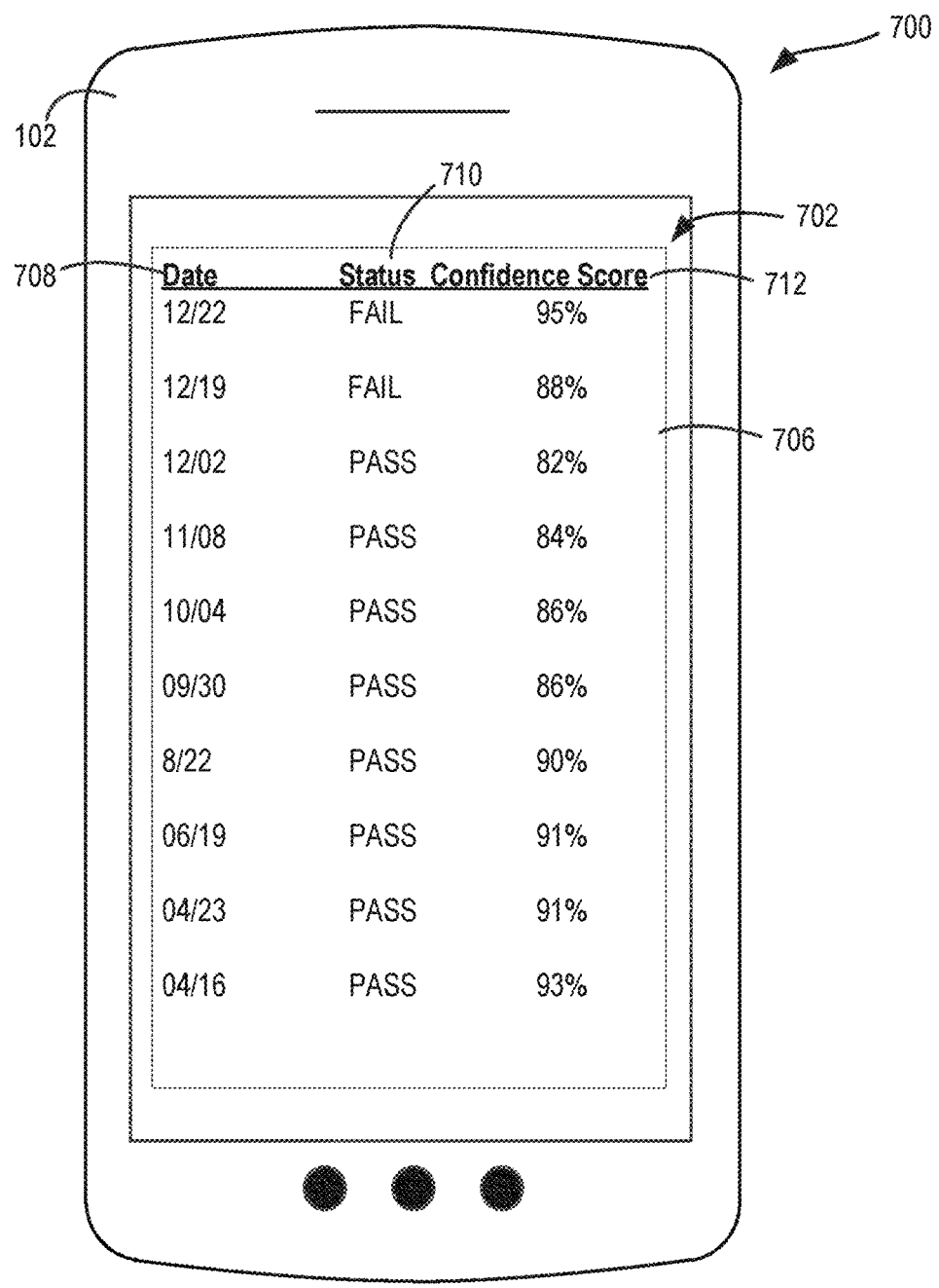
FIG. 7 is a schematic diagram depicting another example user interface of the user device used in the environment in FIG. 1, according to an example embodiment.

Referring to FIG. 6, an example user interface 600 of the user device is shown. The user interface 600 is an example of the interface generated when a component, such as the card reader component 510 of FIG. 5, has been deemed likely to be compromised. The user interface 600 includes a viewing area 602, where the user can view the ATM 106. In this case, upon a determination of a compromise score, the user interface 500 of FIG. 5 is replaced by the user interface 600 of FIG. 6 to show the compromise score and more details relating to the status history of the ATM 106. The user interface 600 includes a text box 608 displaying a compromise score 616, which as shown, was calculated by the ATM management system 122 to be 64%. The compromise score is also shown above the viewing area 602 in the form of a slide display 606. The slide display 606 may take various forms indicating to the user the probability that the ATM 106 is compromised. As such the slide display 606 may also be colorized such that when the slide display 606 is shown in a green color, the slide display 606 indicates a passing score and when the slide display 606 is shown in a red color, the slide display 606 indicates a failing score. The overlay on the viewing area 602 displays a compromise indicator 606 at the card reader 512 indicating the card reader 512 as the compromised component. The text box 608 also includes a "View Previous Scores" selection option 618, a "Report this ATM" selection option 620, and a "Find another ATM" selection option 622. Selection of the "View Previous Scores" selection option 618 generates and displays the user interface 700 of FIG. 7. User interface 700 displays a listing of dates 708, statuses 710, and compromise scores 712 of the ATM 106.

Figure 8:
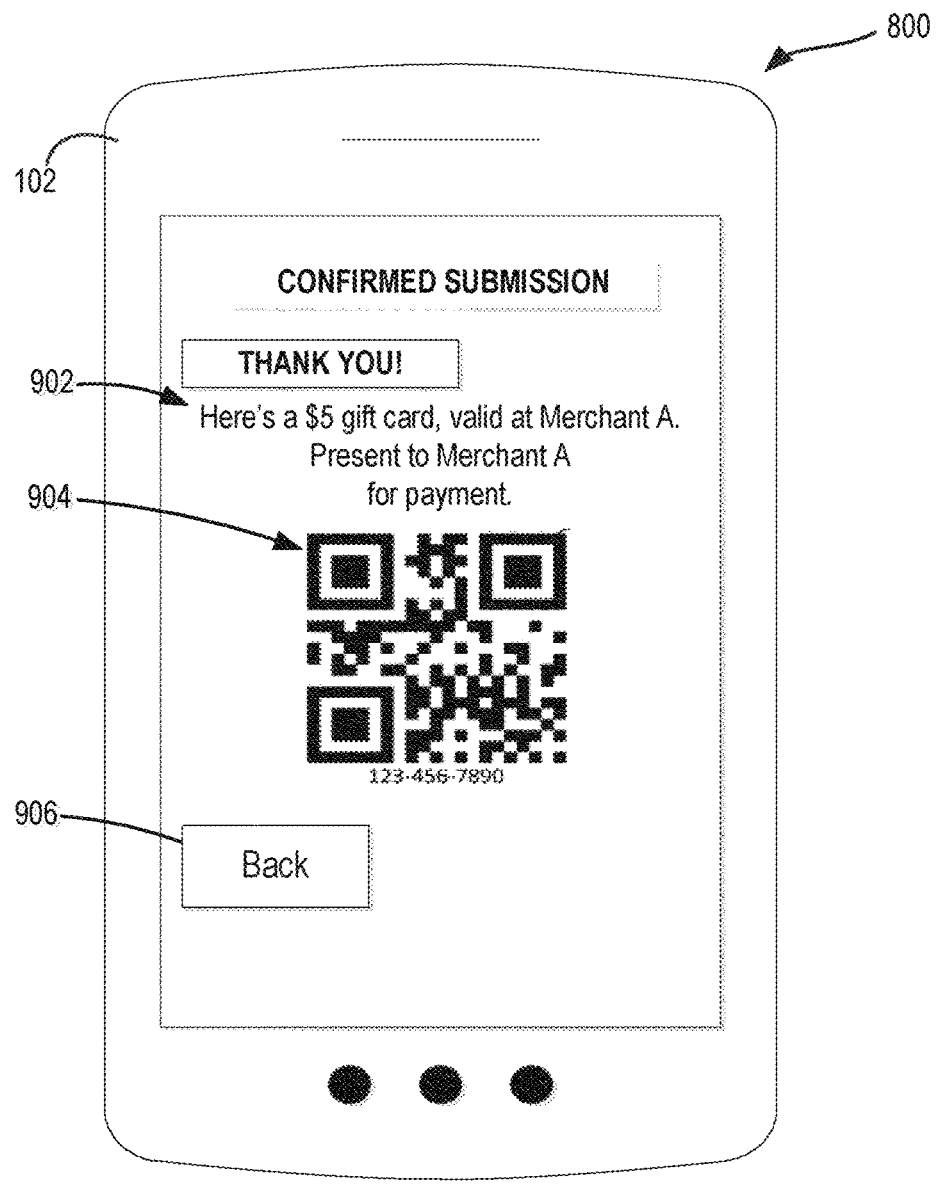
FIG. 8 is a schematic diagram depicting another example user interface of the user device used in the environment in FIG. 1, according to an example embodiment.

Referring back to FIG. 6, in some arrangements, the selection of the "Report this ATM" selection option 620 may generate and display the user interface 800 of FIG. 8. In some arrangements, if the user selections option 620, the user is then brought to the interface 800 shown in FIG. 8. FIG. 8 displays an interface 800 presented on the user device 102 including a reward offer for reporting the ATM 106. The interface 800 includes offer redemption instructions 802 and an offer redemption method 804. The redemption instructions 802 instruct the user regarding the next step to redeem the offer. After redemption, the redemption instructions 802 notify the user that the reward has been redeemed. In the case where the reward offer involves enabling the user to pay for an identified transaction, the redemption instructions 802 prompt the user to take additional steps to redeem the offer. As shown, the redemption instructions 802 prompt the user to present the redemption method 804 to a merchant. As shown, the redemption method 804 is a Quick Response (QR) code through which the user can complete a previously identified transaction, by having the merchant scan the QR code. As a person having ordinary skill in the art will appreciate, the appearance of the various depictions and graphics discussed herein will take on different forms based on the plurality of different implementations.

Figure 9:
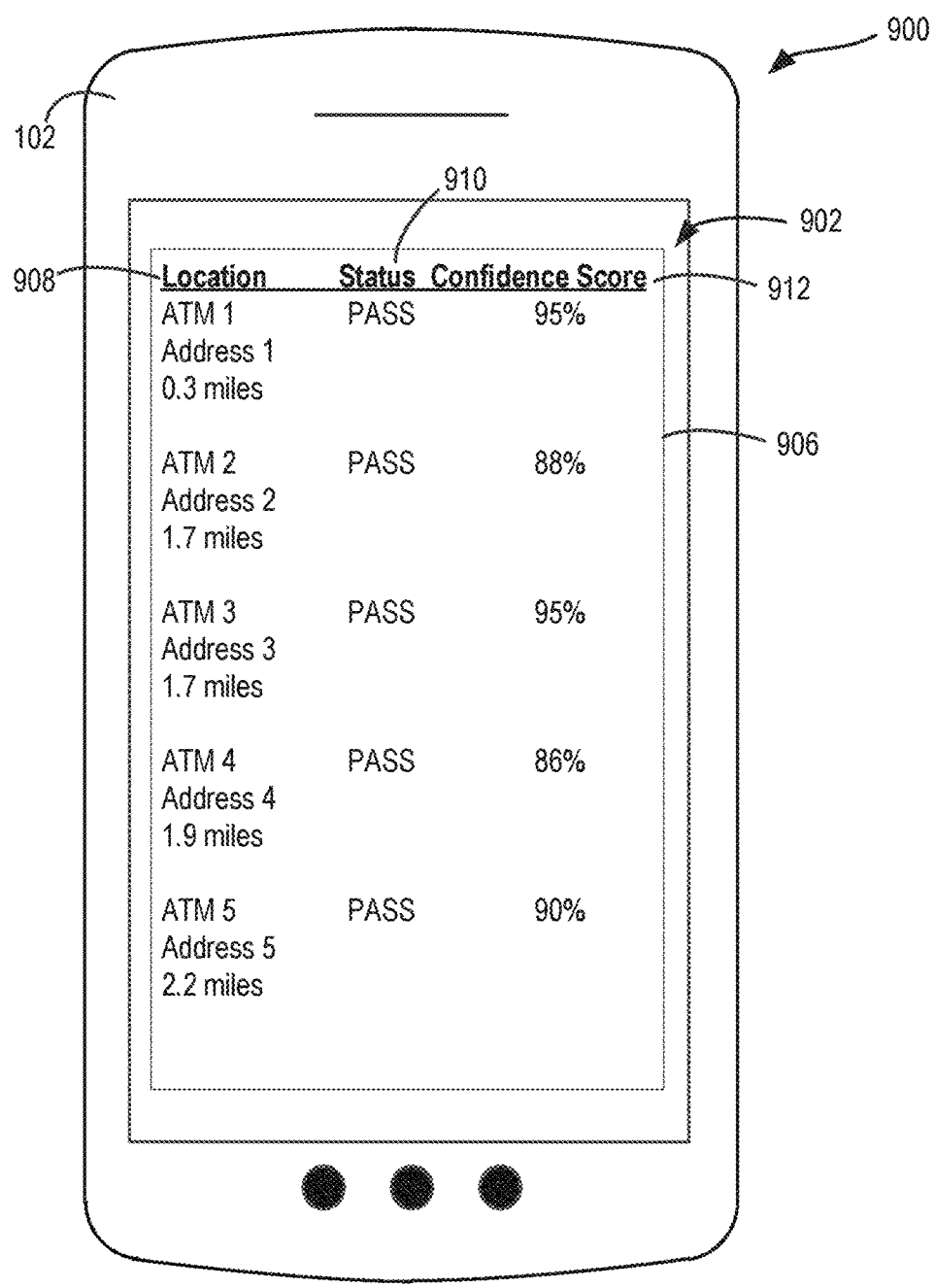
FIG. 9 is a schematic diagram depicting another example user interface of the user device used in the environment in FIG. 1, according to an example embodiment.

Referring back to FIG. 6, selection of the "Find Another ATM" selection option 622 generates and displays the user interface 900 of FIG. 9. User interface 900 displays a listing of other ATMs 106 the user is proximate, along with the respective statuses 910 and compromise scores 912 of those ATMs 106. A user can also select the "Done" option 624 to exit the user interface 600.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:
    capturing, by a user device, an image of an automated teller machine (ATM);
    detecting, by the user device, a signal near the ATM;
    retrieving, by the user device, historical ATM data associated with the ATM;
    determining, by the user device, that the signal is indicative of the ATM being compromised based on the historical ATM data;
    calculating, by the user device, a compromise score based at least on the determination that the signal is indicative of the ATM being compromised;
    generating, by the user device, compromise data including at least the compromise score;
    augmenting, by the user device, the image of the ATM in a manner which reflects the compromise score; and
    displaying, by the user device, the augmented image on a user interface of the user device.

2. The method of claim 1, wherein the signal is separate from an ATM signal associated with the ATM and is indicative of an ambient data capture device in an area proximate the ATM.

3. The method of claim 2, wherein the signal is one of a Bluetooth signal or a Wi-Fi protocol signal.

4. The method of claim 2, wherein the ambient data capture device is one of an electronic reader attached to the ATM or a camera positioned to capture a user's PIN from a distance away from the ATM.

5. The method of claim 1, wherein the historical ATM data comprises an ongoing log of detected signals at the ATM.

6. The method of claim 5, wherein determining that the signal is indicative of the ATM being compromised comprises:
    determining that the signal is a new signal that has not been detected at the ATM before based on the ongoing log of detected signals at the ATM.

7. The method of claim 5, wherein determining that the signal is indicative of the ATM being compromised comprises:
    determining that the signal is separate from an ATM signal associated with the ATM and has been detected multiple times at the ATM based on the ongoing log of detected signals at the ATM.

8. A provider computing system, comprising:
    a network interface; and
    a processing circuit comprising one or more processors coupled to non-transitory memory, the memory comprising an automated teller machine (ATM) database, and wherein the processing circuit is structured to:
receive a detected signal from a user device proximate the ATM;
retrieve historical ATM data associated with the ATM;
determine that the signal is indicative of the ATM being compromised based on the historical ATM data;
calculate a compromise score based at least on the determination that the signal is indicative of the ATM being compromised;
generate compromise data including at least the compromise score; and
transmit the compromise score to the user device to be displayed on a viewing area of the user device.

9. The system of claim 8, wherein the signal is separate from an ATM signal associated with the ATM and is indicative of an ambient data capture device in an area proximate the ATM.

10. The system of claim 9, wherein the signal is one of a Bluetooth signal or a Wi-Fi protocol signal.

11. The system of claim 9, wherein the ambient data capture device is one of an electronic reader attached to the ATM or a camera positioned to capture a user's PIN from a distance away from the ATM.

12. The system of claim 8, wherein the historical ATM data comprises an ongoing log of detected signals at the ATM.

13. The system of claim 12, wherein the processing circuit is further structured to:
determine that the signal is a new signal that has not been detected at the ATM before based on the ongoing log of detected signals at the ATM;
wherein determining that the signal is indicative of the ATM being compromised is based on determining that the signal is a new signal that has not been detected at the ATM before.

14. The system of claim 12, wherein the processing circuit is further structured to:
determine that the signal is separate from an ATM signal associated with the ATM and has been detected multiple times at the ATM based on the ongoing log of detected signals at the ATM;
wherein determining that the signal is indicative of the ATM being compromised is based on determining that the signal is separate from an ATM signal associated with the ATM and has been detected multiple times at the ATM.

15. A mobile device, comprising:
a network interface circuit structured to communicate data to and from a provider computing system associated with a provider;
a sensor structured to detect a signal;
an input/output device structured to exchange data with a user; and
a processing circuit comprising a processor and memory, the processing circuit structured to:
capture, by the input/output device, an image of an automated teller machine (ATM);
detect, by the sensor, the signal near the ATM;
retrieve historical ATM data associated with the ATM;
determine that the signal is indicative of the ATM being compromised based on the historical ATM data;
calculate a compromise score based at least on the determination that the signal is indicative of the ATM being compromised;
generate compromise data including at least the compromise score;
augmenting the image of the ATM in a manner which reflects the compromise score; and
display, by the input/output device, a user interface including the augmented image.

16. The mobile device of claim 15, wherein the signal is separate from an ATM signal associated with the ATM and is indicative of an ambient data capture device in an area proximate the ATM.

17. The mobile device of claim 16, wherein the signal is one of a Bluetooth signal or a Wi-Fi protocol signal.

18. The mobile device of claim 15, wherein the historical ATM data comprises an ongoing log of detected signals at the ATM.

19. The mobile device of claim 18, wherein the processing circuit is further structured to:
determine that the signal is a new signal that has not been detected at the ATM before based on the ongoing log of detected signals at the ATM;
wherein determining that the signal is indicative of the ATM being compromised is based on determining that the signal is a new signal that has not been detected at the ATM before.

20. The mobile device of claim 18, wherein the processing circuit is further structured to:
determine that the signal is separate from an ATM signal associated with the ATM and has been detected multiple times at the ATM based on the ongoing log of detected signals at the ATM;
wherein determining that the signal is indicative of the ATM being compromised is based on determining that the signal is separate from an ATM signal associated with the ATM and has been detected multiple times at the ATM.

* * * * *